United States Patent [19]

Sheidler

[11] Patent Number: 5,639,148
[45] Date of Patent: Jun. 17, 1997

[54] UNDERCARRIAGE ADJUSTMENT MECHANISM FOR A TRACKED VEHICLE

[75] Inventor: Alan David Sheidler, Moline, Ill.

[73] Assignee: Deere & Company, Moline, Ill.

[21] Appl. No.: 632,808

[22] Filed: Apr. 17, 1996

[51] Int. Cl.[6] .......................... B62D 55/12; B62D 55/084
[52] U.S. Cl. .............................. 305/116; 305/138
[58] Field of Search ........................... 305/116, 138, 305/153, 154, 21, 31, 32; 180/9.1, 9.52

[56] References Cited

U.S. PATENT DOCUMENTS

| | | | |
|---|---|---|---|
| 5,127,714 | 7/1992 | Satzler | 305/116 X |
| 5,293,948 | 3/1994 | Crabb | 305/138 X |
| 5,340,205 | 8/1994 | Nagorcka | 305/132 |
| 5,409,305 | 4/1995 | Nagorcka | 305/116 |

*Primary Examiner*—Russell D. Stormer

[57] ABSTRACT

An adjustment mechanism for providing fine adjustments of the relative position of the first wheel relative to the other wheel or wheels in a belted track system. The adjustment mechanism comprises a screw jack assembly that is mounted to the first and second flanges of a first longitudinal member and a second longitudinal member, respectively. After loosening the fastening bolts for the two flanges, the screw jack can be manipulated rotating the first longitudinal member relative to the second longitudinal member. After the correct adjustment position has been found, the fastening bolts can be retightened.

7 Claims, 1 Drawing Sheet

UNDERCARRIAGE ADJUSTMENT MECHANISM FOR A TRACKED VEHICLE

BACKGROUND OF THE INVENTION

1. Field of the Invention

The invention is directed to an adjustment mechanism for adjusting the rotational position of a first wheel relative to a second wheel of a tracked vehicle.

2. Description of the Prior Art

Belted track crawlers have two or more wheels around which the belted track is entrained. One of the wheels is a drive wheel, the other wheel or wheels being idlers. One problem with belted track crawlers is that the belt can become misaligned, and not tracked in the desired fashion over the wheels over which it is entrained. This misalignment can be a result of design defects in the belt itself or in other parts of the track assembly. Such misalignment can also occur as a result of incorrect installation.

One proposed solution for overcoming this misalignment problem is disclosed in U.S. Pat. No. 5,409,305, which is incorporated herein by reference. In this patent, the front idler is rotatively mounted to a first longitudinal member having a first flange. This first flange adjoins a second flange which is part of a second longitudinal member. The second longitudinal member is provided with a series of arcuate slots which cooperate with fastening bolts to hold and secure the first longitudinal member in its correct rotational position relative to the second longitudinal member.

SUMMARY

It is the main object of the present invention to provide an improvement over the adjustment assembly disclosed in U.S. Pat. No. 5,409,305, discussed above in the description of the prior art.

A track undercarriage is provided with a first wheel and a second wheel around which is entrained a belted track. The first wheel is rotatively mounted to a first longitudinal member. This first longitudinal member has a first flange. A second longitudinal member is mounted to the first longitudinal member and is provided with a second flange which adjoins the first flange of the first longitudinal member. The flanges are provided with a series of holes and arcuate slots so that the first longitudinal member may be rotated and fixed in position relative to the second longitudinal member. It is fixed in position by fastening bolts passing through the arcuate slots and holes. The improvement comprises an adjustment mechanism which is mounted to the first and second flanges for rotating the first longitudinal member relative to the second longitudinal member. After the first longitudinal member is rotated it can be locked in place by the adjustment mechanism and then further secured by tightening the fastening bolts.

The adjustment mechanism comprises a screw jack that is mounted to a bell crank. More specifically, the screw jack comprises a threaded hook bolt that is coupled to a pin passing through the bell crank. The bell crank extends from the second flange. The screw jack is mounted to the first flange by a bracket. Two nuts are used to drive and secure the hook bolt of the jack assembly. The screw jack in turn rotates the first wheel either clockwise or counterclockwise relative to the other wheels.

DETAILED DESCRIPTION

Figure 1:
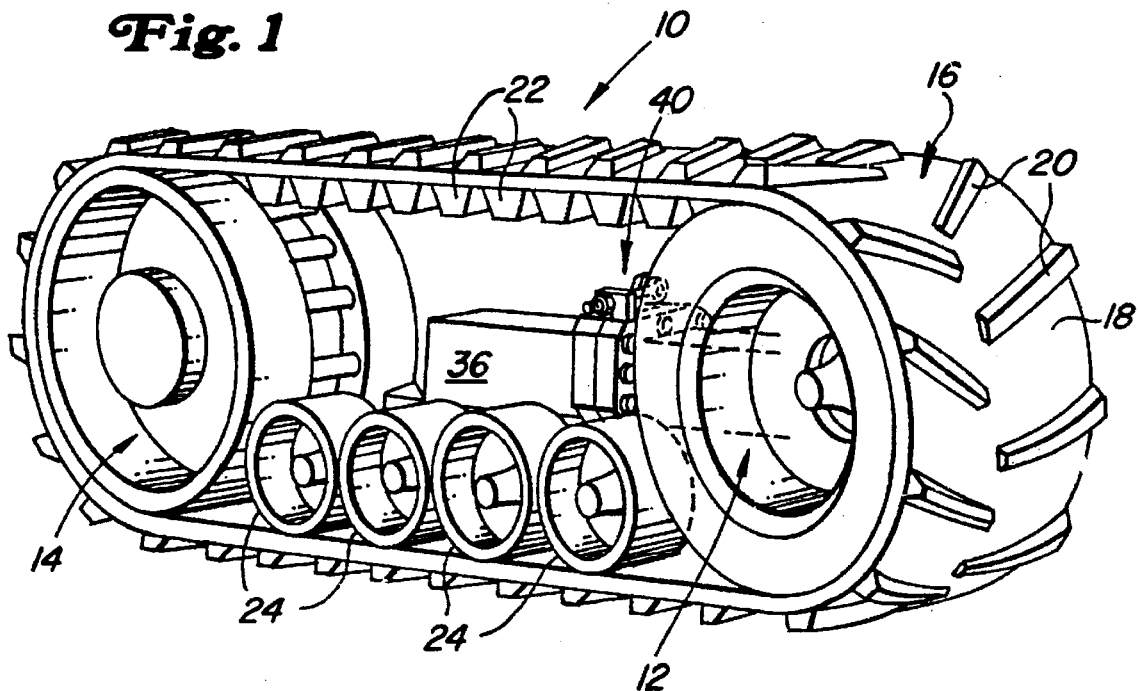
FIG. 1 is a front prospective view of a track undercarriage having the present invention.

FIG. 1 discloses a track undercarriage 10 having a first idler wheel 12 and a second drive wheel 14. A belted track 16 is entrained around both of these wheels. This belted track is provided with a flat body 18. The outside of the body is provided with a series of grousers 20 while the inside of the body is provided with a series of guide lugs 22. The track undercarriage is also provided with a series of four track rollers 24 for distributing the weight of the vehicle on the belted track. It should be noted that the illustrated embodiment is a relatively conventional track assembly. However, this invention may also be utilized on a high drive track assembly of the type used in combine half track designs. More specifically, this invention may be utilized with half track designs of the type illustrated in U.S. Pat. No. 5,340,205, which is incorporated herein by reference. More specifically, the adjustment mechanism of the present invention has been utilized on just such a high drive track assembly for a combine.

In the illustrated embodiment the first wheel or idler 12 is rotatably mounted to a first longitudinal member 30. The first longitudinal member is provided with a first flange 32 having a series of holes, not shown. The first flange 32 joins a second flange 34 mounted to a second longitudinal member 36. The second flange is provided with a series of arcuate slots 37 that correspond to the holes in the first flange 32 and through which fastening bolts 38 may pass. As disclosed previously in U.S. Pat. No. 5,409,305, the first longitudinal member can be rotated a limited amount relative to the second longitudinal member and then fixed in place by tightening the fastening bolts.

Figure 2:
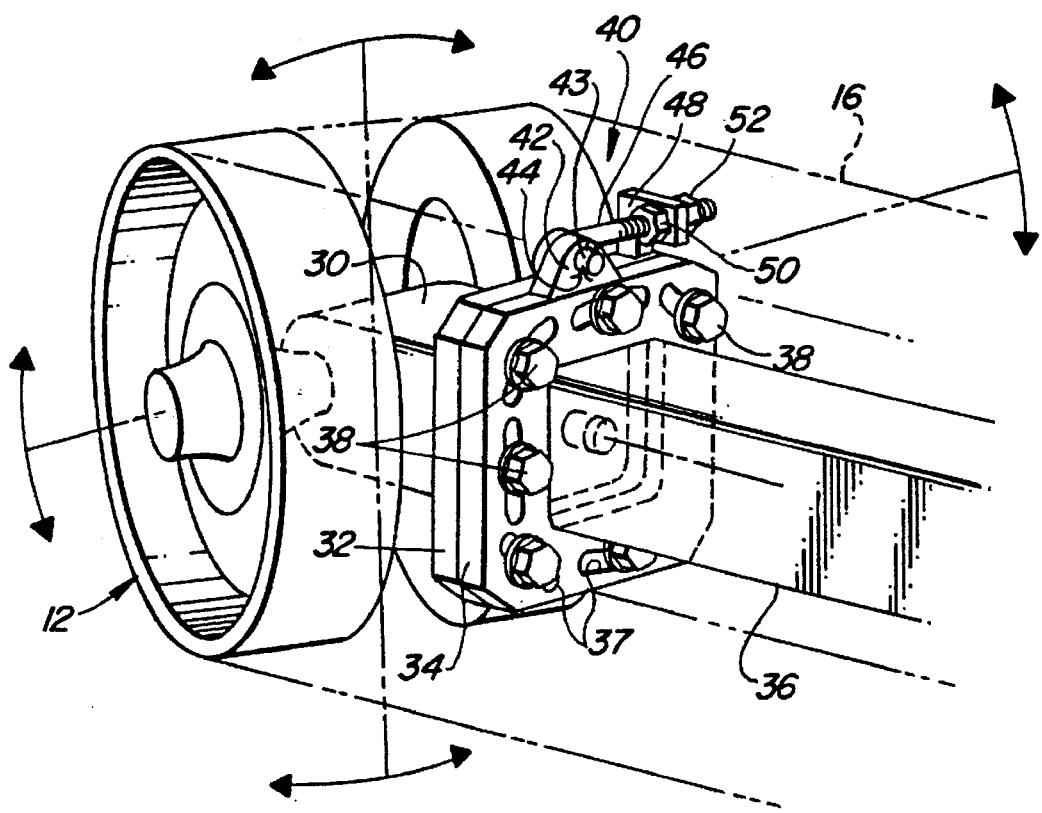
FIG. 2 is a rear prospective view of the present invention.

The improvement of the present invention is the addition of the adjustment assembly 40 to the top of the first and second flanges 32 and 34. This adjustment mechanism comprises a screw jack which provides a simplified means of rotating the first longitudinal member relative to the second longitudinal member when the fastening bolts are loosened. The structure of this assembly is a bell crank 42 extending from the second flange 34. The bell crank 42 is provided with a pin 43 that projects longitudinally therefrom and is held in place by a cotter pin 44. A threaded hook bolt 46 hooks onto the pin 43 and is mounted to upstanding bracket 48 of the first flange 32. This hook bolt is provided with two nuts 50 and 52 for rotating the first flange relative to the second flange to adjust the alignment of the first longitudinal member. As illustrated in FIG. 2, rotation of nut 50 against bracket 48 drives the first longitudinal member clockwise relative to the second longitudinal member, whereas rotation of nut 52 against the bracket 48 drives the first longitudinal member counterclockwise relative to the second longitudinal member. These nuts can also be used to temporarily hold the adjusted first longitudinal member in place until the fastening bolts are retightened.

The above described adjustment mechanism provides a relatively convenient and simple way to make fine adjustments in the relative position of the first wheels to the other wheels. In addition, it provides a good frame of reference of how much adjustment has been made. By properly adjusting the first wheels relative to the other wheels in the drive system provides for optimal life of the wheels and the belt.

The above described invention should not be limited to the above described embodiment but should be limited solely to the claims that follow.

I claim:

1. A track assembly comprising:
   a first wheel;
   a second wheel;
   a belted track entrained around the first wheel and the second wheel;
   a first longitudinal member to which the first wheel is rotatively mounted, the first longitudinal member having a first flange;
   a second longitudinal member is coupled to the first longitudinal member, the second longitudinal member having a second flange that adjoins the first flange of the first longitudinal member, the first and second flanges are provided with holes and arcuate slots through which fastening bolts are inserted for joining the longitudinal members together, the arcuate slots allow for limited rotation of the first longitudinal member relative to the second longitudinal member;
   an adjustment mechanism is mounted to the first and second longitudinal members for rotating the first longitudinal member relative to the second longitudinal member.

2. A track assembly as defined by claim 1 wherein the adjustment mechanism is mounted to the first and second flanges.

3. A track assembly as defined by claim 2 wherein the adjustment mechanism comprises a bell crank that is that is driven by a screw jack.

4. A track assembly as defined by claim 3 wherein the bell crank is mounted to the second flange and the screw jack is mounted to the first flange.

5. A track assembly as defined by claim 4 wherein the screw jack comprises a threaded hook bolt.

6. A track assembly as defined by claim 5 wherein the first wheel comprise an idler.

7. A track assembly as defined by claim 6 wherein the second wheel comprises a drive wheel.

* * * * *